United States Patent
Eldar

(10) Patent No.: US 7,257,572 B2
(45) Date of Patent: Aug. 14, 2007

(54) FUNCTION FOR DIRECTING PACKETS

(75) Inventor: Avigdor Eldar, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 10/837,121

(22) Filed: Apr. 30, 2004

(65) Prior Publication Data

US 2006/0004782 A1   Jan. 5, 2006

(51) Int. Cl.
*G06F 17/30* (2006.01)

(52) U.S. Cl. .............. 707/3; 707/1; 707/100; 707/101; 707/102; 713/165

(58) Field of Classification Search ........ 707/100–102, 707/1–5; 713/165
See application file for complete search history.

(56) References Cited

U.S. PATENT DOCUMENTS

| | | | | |
|---|---|---|---|---|
| 6,633,880 B1 * | 10/2003 | Modelski et al. | ........... | 707/100 |
| 6,738,779 B1 * | 5/2004 | Shapira | ........... | 707/101 |
| 6,795,917 B1 * | 9/2004 | Ylonen | ........... | 713/160 |
| 2001/0042204 A1 * | 11/2001 | Blaker et al. | ........... | 713/165 |
| 2003/0131010 A1 * | 7/2003 | Redpath | ........... | 707/100 |
| 2003/0182291 A1 * | 9/2003 | Kurupati et al. | ........... | 707/100 |
| 2003/0223424 A1 * | 12/2003 | Anderson et al. | ........... | 370/395.32 |
| 2005/0228851 A1 * | 10/2005 | Cornett | ........... | 709/200 |
| 2006/0104286 A1 * | 5/2006 | Cheriton | ........... | 370/395.32 |

OTHER PUBLICATIONS

EZchip Technologies, "7-Layer Packet Processing: A Performance Analysis", Jul. 2000, www.ezchip.com/html/tech_7layer.html-40k.*

Postel, J. (Editor), "Transmission Control Protocol", RFC 793, [online], Sep. 1981 [retrieved on Aug. 2, 2006], 88 pages, retrieved from the Internet at <URL: http://rfc.net/rfc793.txt>.

* cited by examiner

*Primary Examiner*—Apu Mofiz
*Assistant Examiner*—Jessica Le
(74) *Attorney, Agent, or Firm*—Konrad Raynes & Victor LLP; Rabindranath Dutta

(57) ABSTRACT

In certain embodiments, a key is received, wherein a value is capable of being generated from the key and an input string corresponding to a packet. Intermediary values are computed based on substrings of the key and substrings of the input string. The intermediary values are stored in a data structure, wherein the stored intermediary values are capable of being used to generate the value.

20 Claims, 11 Drawing Sheets

```
        400   402  408
          \    \    \
       CalcHash(input[], N)

{
            /* input[] is an input string of N bytes, i.e., 8N bits */
    312
            /* K is the secret key of 40 bytes, i.e., 320 bits */

410 —  result = 0;

412 —  FOR each bit b in input[]
            {
414 —       IF (b==1) then result ^ = left-most 32 bits of K 416 —       Shift K left 1 bit position
                       406
            }          /
            RETURN result
       }
```

Lookup Table — 114 (Data Structure)
Byte Value — 502
500 Key Offset

```
                            600
                             /
602 — SecretKey[40]                    /* The Secret Key is 40 bytes in length */
604 — UNSIGNED LONG LookUpTable[256][36]
                       611
608 — InitHashTable()       606
         FOR (KeyOffset = 0 to 35) {    612
             FOR (ByteValue = 0 TO 255) {
                 LookUpTable[ByteValue][KeyOffset] = CalcByte(ByteValue, KeyOffset)
             }
         }          614    616
                     /      /
610 — CalcByte (byte input, KeyOffset)
      {
618 — result = 0
620 — Key = SecretKey[KeyOffset]
622 — NextKey = SecretKey[KeyOffset + 4]
624 — FOR each bit b in input {
626 —     IF (b==1) result ^=Key
          /* Shift Key, NextKey by one place to the left */
628 —   { Key = (Key << 1 | NextKey >> 31)
          { NextKey <<= 1
      }
613 — Return result
      }
```

FIG. 6

```
                          700                            704  706
                           |                              |    |
             HashResult = CalcHashFromLookUpTable (input, L)
                     702
                      |
             CalcHashFromLookUpTable (PUCHAR input, UINT32 BytesLength)

{    708
                   |
                  result = 0;

FOR each byte i in input { result ^= LookUpTable[input[i]] [i]

} return result

FUNCTION FOR DIRECTING PACKETS

BACKGROUND

Receive side scaling (RSS) is a feature in an operating system that allows network adapters that support RSS to direct packets of certain Transmission Control Protocol/Internet Protocol (TCP/IP) flow to be processed on a designated Central Processing Unit (CPU), thus increasing network processing power on computing platforms that have a plurality of processors. Further details of the TCP/IP protocol are described in the publication entitled "Transmission Control Protocol: DARPA Internet Program Protocol Specification," prepared for the Defense Advanced Projects Research Agency (RFC 793, published September 1981). The RSS feature scales the received traffic across the plurality of processors in order to avoid limiting the receive bandwidth to the processing capabilities of a single processor.

In order to direct a packet to the appropriate CPU, a hash function is defined that takes as an input the header information included in the packet, and outputs a hash value used to identify the CPU on which the packet should be processed by a device driver and the TCP/IP stack. The hash function is run across the connection-specific information in each incoming packet header. Based on the hash value, each packet is assigned to one CPU of a plurality of CPUs for execution.

BRIEF DESCRIPTION OF THE DRAWINGS

Referring now to the drawings in which like reference numbers represent corresponding parts throughout:

FIG. 4 illustrates exemplary pseudo-code to calculate a hash value, in accordance with certain embodiments;

FIG. 5 illustrates a block diagram of a lookup table that includes intermediary values, such as, partial hash values, in accordance with certain embodiments;

FIG. 6 illustrates exemplary pseudo-code to implement a lookup table, in accordance with certain embodiments;

FIG. 7 illustrates exemplary pseudo-code to calculate a hash value from partial hash values, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Figure 1:
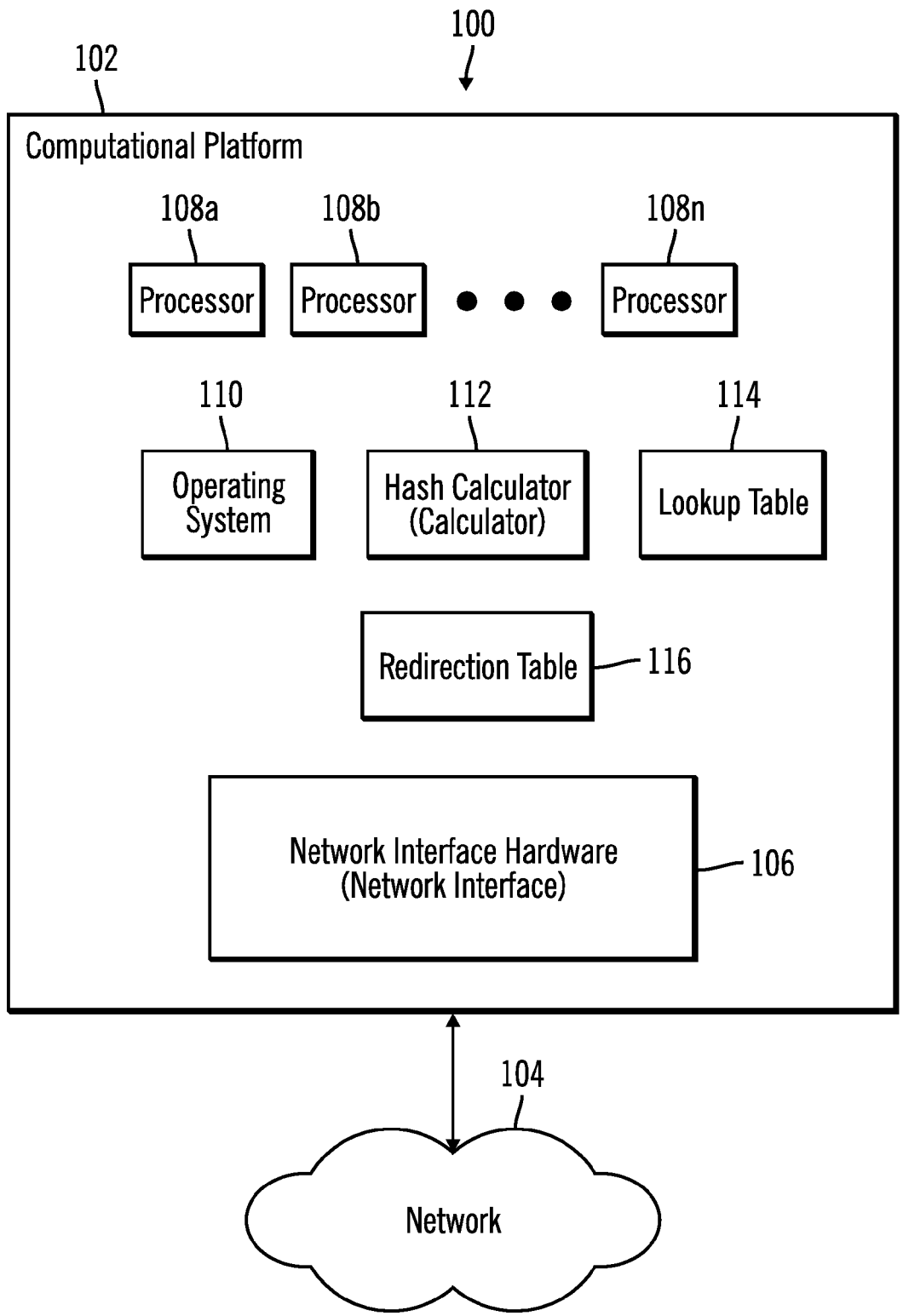
FIG. 1 illustrates a computing environment, in accordance with certain embodiments.

FIG. 1 illustrates a computing environment 100, in accordance with certain embodiments. A computational platform 102 is coupled to a network 104 via a network interface hardware 106. The computational platform 102 may send and receive packets from other devices (not shown) through the network 104.

The computational platform 102 may be a personal computer, a workstation, a server, a mainframe, a hand held computer, a palm top computer, a laptop computer, a telephony device, a network computer, a blade computer, or any other computational platform. The network 104 may comprise the Internet, an intranet, a Local area network (LAN), a Storage area network (SAN), a Wide area network (WAN), a wireless network, etc. The network 104 may be part of one or more larger networks or may be an independent network or may be comprised of multiple interconnected networks. The network interface hardware 106 may send and receive packets over the network 106. In certain embodiments the network interface hardware 106 may include a network adapter, such as, a TCP/IP offload engine (TOE) adapter.

In certain embodiments, the computational platform 102 may comprise a plurality of processors 108a . . . 108n, an operating system 110, a hash calculator 112, a lookup table 114, and a redirection table 116. In certain alternative embodiments, the hash calculator 112 and the redirection table 116 may be included in the network interface hardware 106. In yet further embodiments, the hash calculator 112 may be included in the computational platform 102 and the redirection table 116 may be included in the network interface hardware 106. In additional embodiments, the hash calculator 112 may be included in the network interface hardware 106 and the redirection table 116 may be included in the computational platform 102.

The plurality of processors 108a . . . 108n may comprise Complex Instruction Set Computer (CISC) or Reduced Instruction Set Computer (RISC) processors or any other processor. The Operating system 110 may comprise an operating system known in the art that is capable of allowing RSS.

The hash calculator 112 may compute a hash function based on the header of a received packet, where the hash function is capable of generating a hash value that maps to an entry of the redirection table 116. In alternative embodiments, the hash calculator 112, may be a calculator that computes a function that is different from a hash function. The hash value is the result of applying a cryptographic hash function to a message, such as, a received packet. In certain embodiments, the received packet may be processed by a processor that corresponds to the entry mapped onto by the hash function. In certain embodiments, the hash calculator 112 generates the hash value from intermediary values, such as, partial hash values, stored in the lookup table 114. Intermediary values, such as, partial hash values, may comprise any value that may contribute towards the calculation of a hash value. In certain embodiments, the intermediary values are first values that contribute towards the calculation of a second value, wherein in certain embodiments the first values may be partial hash values and the second value may be a hash value. In certain embodiments, the hash calculator 112 and the data structure that implements the lookup table 114 may be implemented in software. In other embodiments the hash calculator 112 may be implemented in hardware in the network interface hardware 106.

The redirection table 116 includes a plurality of entries, where each entry may be used to point to one of the plurality of processors 108a . . . 108n where received packets may be processed. In certain embodiments, each entry in the redirection table 116 may be used to point to one of the plurality of processors 108a . . . 108n where received packets may be processed. The redirection table 116 may be implemented in software in the computational platform 102. In alternative embodiments, the redirection table 116 may be implemented in hardware in the network interface hardware 106.

Figure 2:
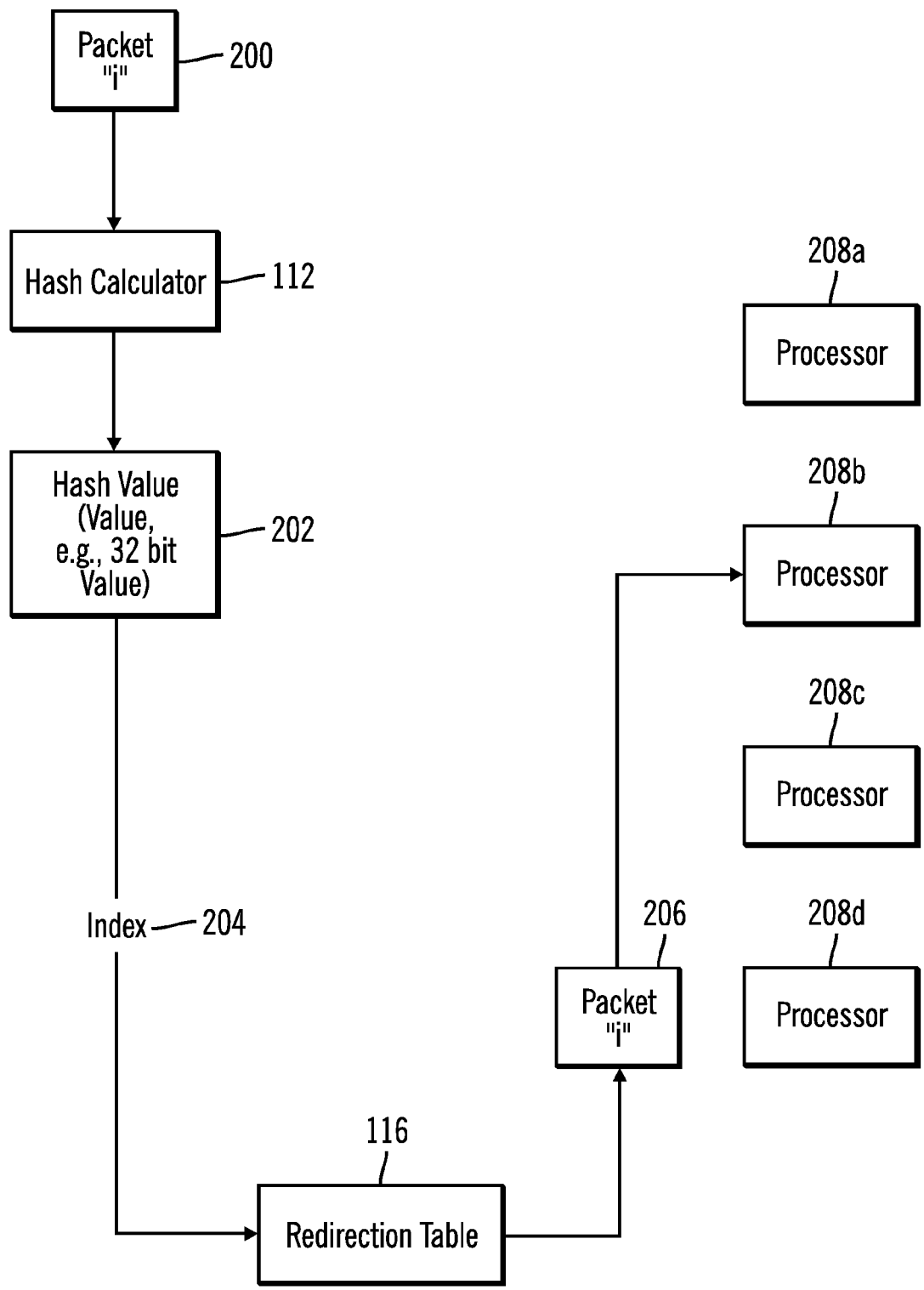
FIG. 2 illustrates a block diagram that shows how a packet is directed to a processor based on a value, such as, a hash value, computed by calculator, such as, a hash calculator, in accordance with certain embodiments.

FIG. 2 illustrates a block diagram that shows how packets are distributed among a plurality of processors, in accordance with certain exemplary embodiments implemented in the computing environment 100.

The network interface hardware 106 receives a packet "i" 200 from the network 104. In certain embodiments, the hash calculator 112 applies a hash function to certain headers of the packet "i" 200 to compute value, such as, a hash value 202. In certain embodiments, the hash value 202 may be a 32-bit value that can be represented by four bytes. In other embodiments, the hash value 202 may be some other value, where the value may be obtained by using a function that may be different from a hash function. The hash value 202 may be used to index 204 into an entry of the redirection table 116. The redirection table 116 maps a packet to a processor based on which entry number the hash value 202 indexes 204 into in the redirection table 116. For example, in certain embodiments the hash value 202 may index 204 into the entry number that points to the processor 208b. In such embodiments, the packet "i" 206 (which is the same as packet "i" 200) is queued to the processor 208b for processing.

In the exemplary embodiment illustrated in FIG. 2, there are four processors 208a, 208b, 208c, 208d that represent the processors 108a . . . 108n. In the exemplary embodiment illustrated in FIG. 2, the hash calculator 112 computes the hash value 202 from the packet "i" 200. The hash value 202 is used to index into the redirection table and map the packet "i" 200 (which is the same as packet "i" 206) to the processor 208b for processing.

Figure 3:
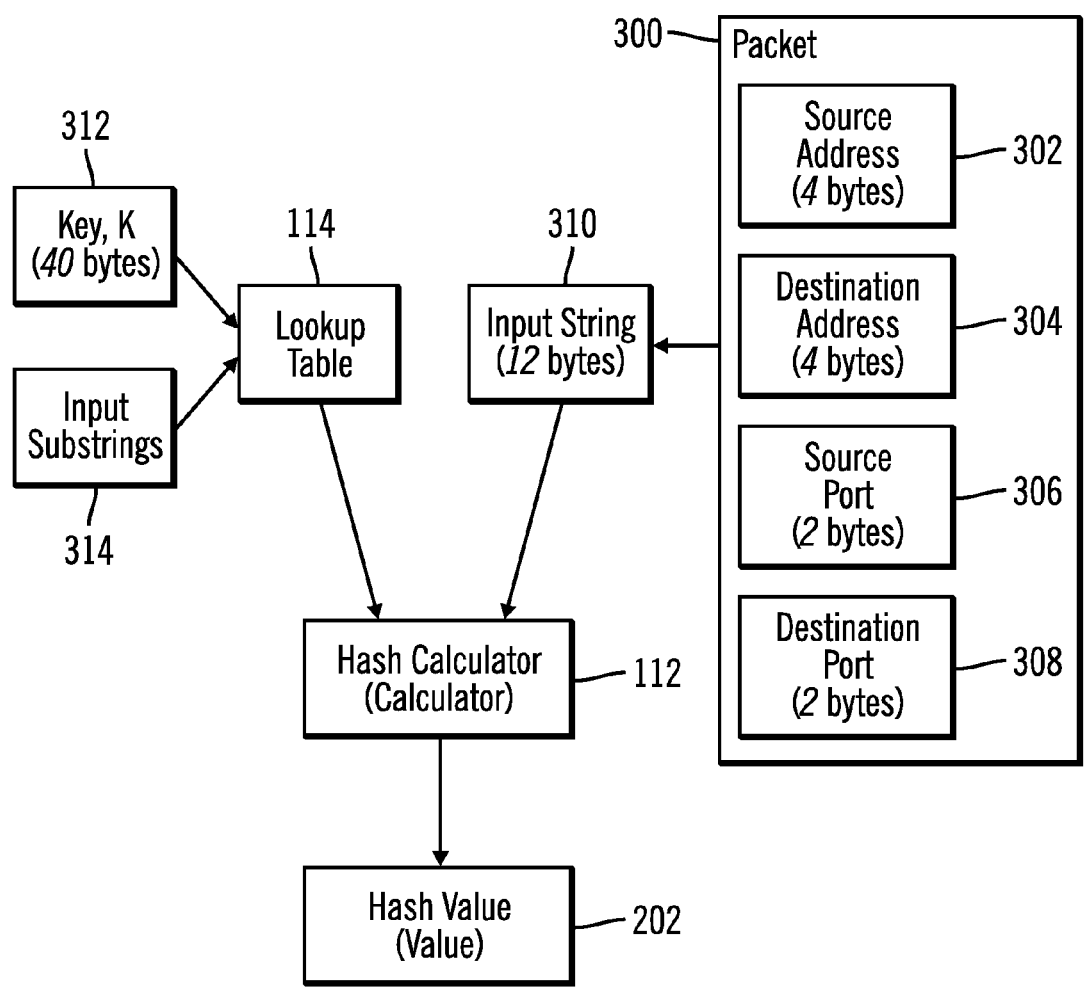
FIG. 3 illustrates a block diagram that shows how the hash calculator computes the hash value, in accordance with certain embodiments.

FIG. 3 illustrates a block diagram that shows how a calculator, such as, the hash calculator 112 computes a value, such as, the hash value 202, in accordance with certain embodiments.

In certain embodiments, a packet 300 that is received by the computational platform 102 may include a source address 302, a destination address 304, a source port 306, and a destination port 308. In certain exemplary embodiments, the source address 302 and the destination address 304 may each be four bytes in length, and the source port 306 and the destination port 308 may each be two bytes in length. The hash calculator 112 may receive the packet 300 and form an input string 310 of twelve bytes based on the four bytes of source address 302, the four bytes of the destination address 304, the two bytes of the source port 306, and the two bytes of the destination port 308.

The operating system 110 may generate a key 312 that may be a cryptographic key. The key 312 may comprise a string of bytes. The operating system 110 may generate the key 300 in response to the booting or powering up of the computational platform 102. The hash calculator 112 may generate the lookup table 114, where the entries of the lookup table 114 include intermediary hash values, such as, partial hash values, computed from substrings of the key 300 and possible input substrings 314. In certain embodiments, the substrings of the key 300 and the possible input substrings 314 may each be of predetermined lengths.

The hash calculator 112 computes the hash value 202 from the partial hash values stored in the lookup table 114 and the input string 310. In certain embodiments, the lookup table 114 is generated at boot time and the hash value 202 is generated at run time. Additionally in certain embodiments, the lookup table 114 is regenerated whenever the key 312 is regenerated. In certain embodiments, partial hash values are stored in the lookup table 114 once per generation of the key 312 by the operating system 110.

FIG. 4 illustrates exemplary pseudo-code to calculate a hash value that does not require the use of the lookup table 114, in accordance with certain alternative embodiments. In certain embodiments, the exemplary code to calculate the hash value may be implemented in the hash calculator 112.

CalcHash 400 is a function that takes an input 402 and based on a key, K, 312 generates a result 406 that is a hash value. In certain embodiments the input 402 is a string of length N (reference numeral 408) bytes and the key, K, 312 is a secret key of 40 bytes. The function CalcHash 400 may start by setting (reference numeral 410) the variable result 406 to zero.

For each bit b in the input 402 (reference numeral 412), if the bit b is one then an exclusive OR operation is performed (reference numeral 414) on the variable result 406 with the left most 32 bits of the key, K, 312. Then for each bit in the input 402 the key, K, 312 is shifted (reference numeral 416) left by one bit.

After each bit b in the input 402 has been processed, the function CalcHash 400 returns the hash value in the variable result 406, where the hash value has been generated from the input 402 and the key K 312.

In certain embodiments, the computation of the hash value by the exemplary pseudo-code described in FIG. 4 requires performing the hash computation at run time by using at least one of the processors 108a . . . 108n. If certain of the operations involved in the hash computation could be performed before receiving packets, e.g., at boot time, and stored in the lookup table 114, then the processing load on the processors 108a . . . 108n for computing the hash value 202 may be reduced.

FIG. 5 illustrates a block diagram of the lookup table 114 that includes intermediary hash values, such as, partial hash values, that can be used to calculate the hash value 202, in accordance with certain embodiments.

The lookup table 114 may include rows corresponding to offsets of the key 312 and columns corresponding to possible substrings of the input string 310. For example, if the key 312 is forty bytes in length then the key offsets 500 may vary from 0 to 35, with the remaining offsets of the key 312 not needed in the lookup table 114. The offsets of the key 312 are at each byte. The $0^{th}$ key offset starts at the first byte of the key 312, the $1^{st}$ key offset starts at the second byte of the key 312 and the $35^{th}$ key offset starts at the $36^{th}$ byte of the key 312. In certain embodiments, the length of the substring of the key that begins at each offset is four bytes.

Corresponding to every key offset 500 the lookup table 114 may have 256 byte values (reference numeral 502). The byte values 0, 1, 2, . . . , 255 represent all possible strings included in a byte of the input string 310.

Each entry of the lookup table 114 may represent an intermediary hash value, such as, a partial hash value, that is computed from a 32-bit substring of the key 312 starting at the key offset 500 and a byte value 502. The partial hash values may be stored in the lookup table 114 at boot time, so that load on the processors 108a . . . 108n is reduced at run time when packets received from the network 104 at the computational platform 102 are to be processed by the processors 108a . . . 108n.

FIG. 6 illustrates exemplary pseudo-code to implement the lookup table 114 that includes partial hash values, in accordance with certain embodiments.

In certain embodiments an array SecretKey 600 represents (reference numeral 602) the key 312, where the key 312 is 40 bytes in length. The lookup table 114 is represented (reference numeral 604) by a data structure LookUpTable 606 that may be a two dimensional array of 256 by 36 entries. In certain embodiments, depending on whether the array is represented in a row-major or column-major order the rows and column dimensions of the data structure LookUpTable 606 may be reversed.

The function InitHashTable 608 calls a function CalcByte 610 to compute the entries of the data structure LookUpTable 606. In the function InitHashTable 608, for every key offset 500 (represented by the variable KeyOffset 611) and byte value 502 (represented by the variable ByteValue 612) the entries of the data structure LookUpTable 606 are populated by calling the function CalcByte 610.

The function CalcByte 610 returns a partial hash value in the variable result 613 based on a one byte input 614 and a KeyOffset 616. The variable result 613 is initialized (reference numeral 618) to zero. The variable Key 620 is a 32-bit substring of the SecretKey 600 starting at KeyOffset 616, and the variable NextKey 622 is a 32-bit substring of the SecretKey 600 that follows the 32-bit Key 620.

For each bit b in the input 614 (reference numeral 624), if the bit is 1 then an exclusive OR operation is performed (reference numeral 414) on the variable result 613 with the Key 620. Then for each bit in the input 614 the Key 620 and the NextKey 622 are shifted (reference numeral 628) left by one bit. While shifting the Key 620 a bitwise "OR" operation is performed with the NextKey 622 shifted right by 31 bits.

After each bit b of the input 614 is processed the result 613 is returned by the function CalcByte 610. If the function InitHashTable 608 had called the function CalcByte 610, then the function InitHashTable 608 receives the result 613. The result 613 is a partial hash value corresponding to an entry of the lookup table 114.

The pseudo-code illustrated in FIG. 6 may in certain embodiments generate the entries of the lookup table 114, where the entries of the lookup table 114 are partial hash values.

FIG. 7 illustrates exemplary pseudo-code to calculate the hash value 202 from the partial hash values in the entries of the lookup table 114, in accordance with certain embodiments. In certain embodiments the exemplary pseudo-code represents code implemented in the hash calculator 112.

The variable HashResult 700 represents the hash value 202 that is calculated by calling the function CalcHashFromLookUpTable 702 with an input 704 of length L 706 bytes. In certain embodiments the input 704 may represent the input string 310 of 12 bytes.

The function CalcHashFromLookUpTable 702 initializes the variable result 708 to zero. For each byte i in the input 704 a bitwise exclusive OR operation is performed on the result 708 with the appropriate entry of the LookUpTable 606.

The variable result 708 is returned by the function CalcHashFromLookUpTable 702, where the variable result 708 represents the hash value 202 computed from the input 704 that represents the input string 310 and the partial hash values stored in the LookUpTable 606 that represents the lookup table 114.

The pseudo-code illustrated in FIG. 7 executes at run time, and returns the hash value 202 in the result 708. The LookUpTable 606 from which the hash value 202 is generated may be created at boot time.

Figure 8:
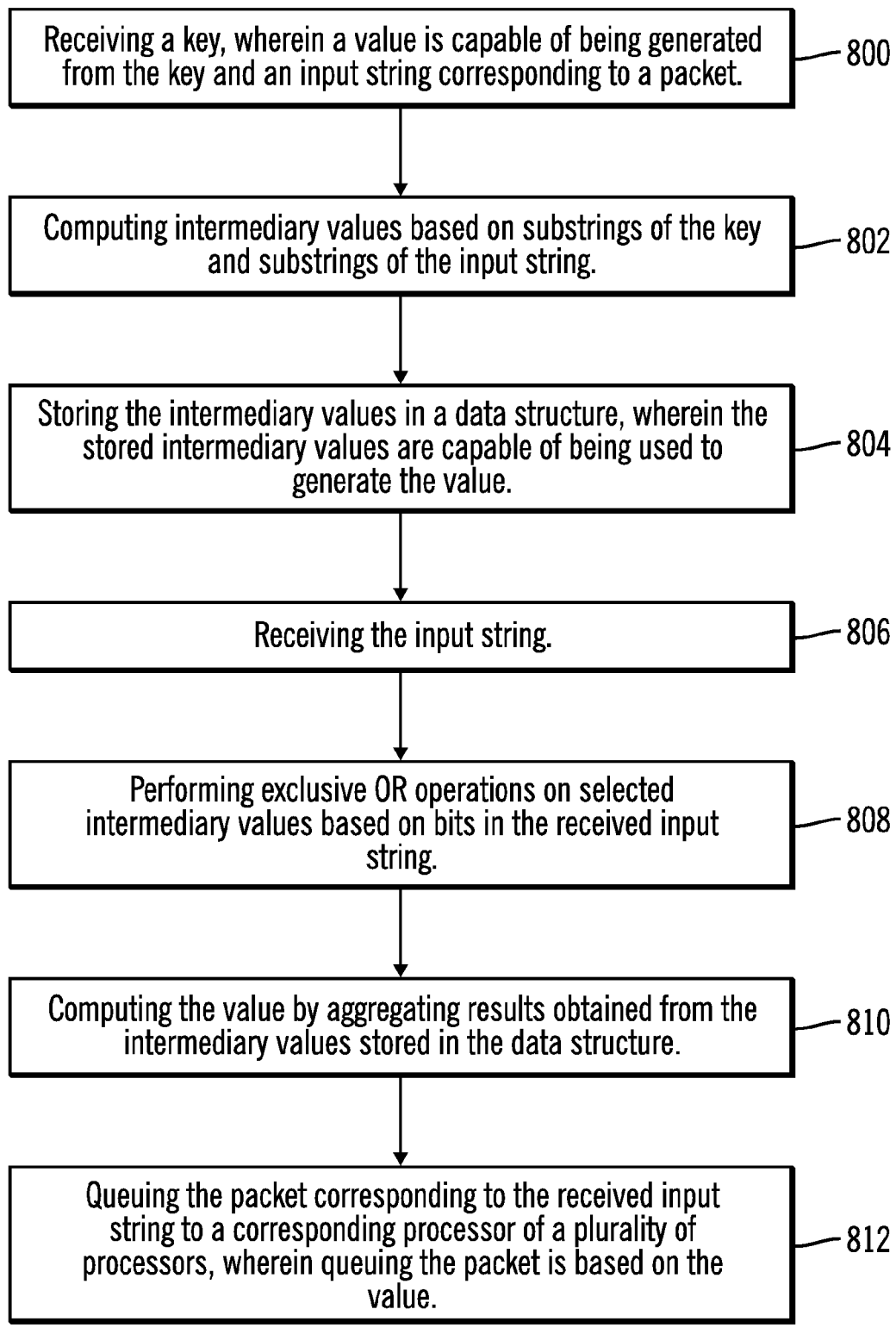
FIG. 8 illustrates first operations for computing a value from intermediary values, in accordance with certain embodiments.

FIG. 8 illustrates first operations implemented in the hash calculator 112 for computing the value 202 from intermediary values, in accordance with certain embodiments.

Control starts at block 800, where the hash calculator 112 receives a key 312, wherein a value 202 is capable of being generated from the key 112 and an input string 310 corresponding to a packet 300.

The hash calculator 112 computes (at block 802) intermediary values based on substrings of the key 312 and substrings of the input string 310. For example, in certain embodiments the substrings of the key 312 may be four bytes in length and the substrings of the input string 310 may be one bye in length.

The hash calculator 112 stores (at block 804) the intermediary values in a data structure 114, wherein the stored intermediary values are capable of being used to generate the value 202.

The hash calculator 112 receives (at block 806) the input string 310. In certain embodiments, the hash calculator 112 performs (at block 808) exclusive OR operations on selected intermediary values based on bits in the received input string 310, prior to computing the value 202.

The hash calculator 112 computes (at block 810) the value 202 by aggregating results obtained from the stored intermediary values in the data structure 114. In certain embodiments, the hash calculator 112 queues (at block 812) the packet corresponding to the received input string 310 to a corresponding processor of a plurality of processors 108a . . . 108n, wherein the queuing is based on the value 202.

In certain embodiments, the key is a secret key generated by the operating system 110, wherein receiving, computing, and storing are performed by an application in a computational platform including the network interface hardware 106, wherein the network interface hardware 106 does not provide support for receive side scaling. In certain embodiments, the secret key may be a cryptographic key.

Figure 9:
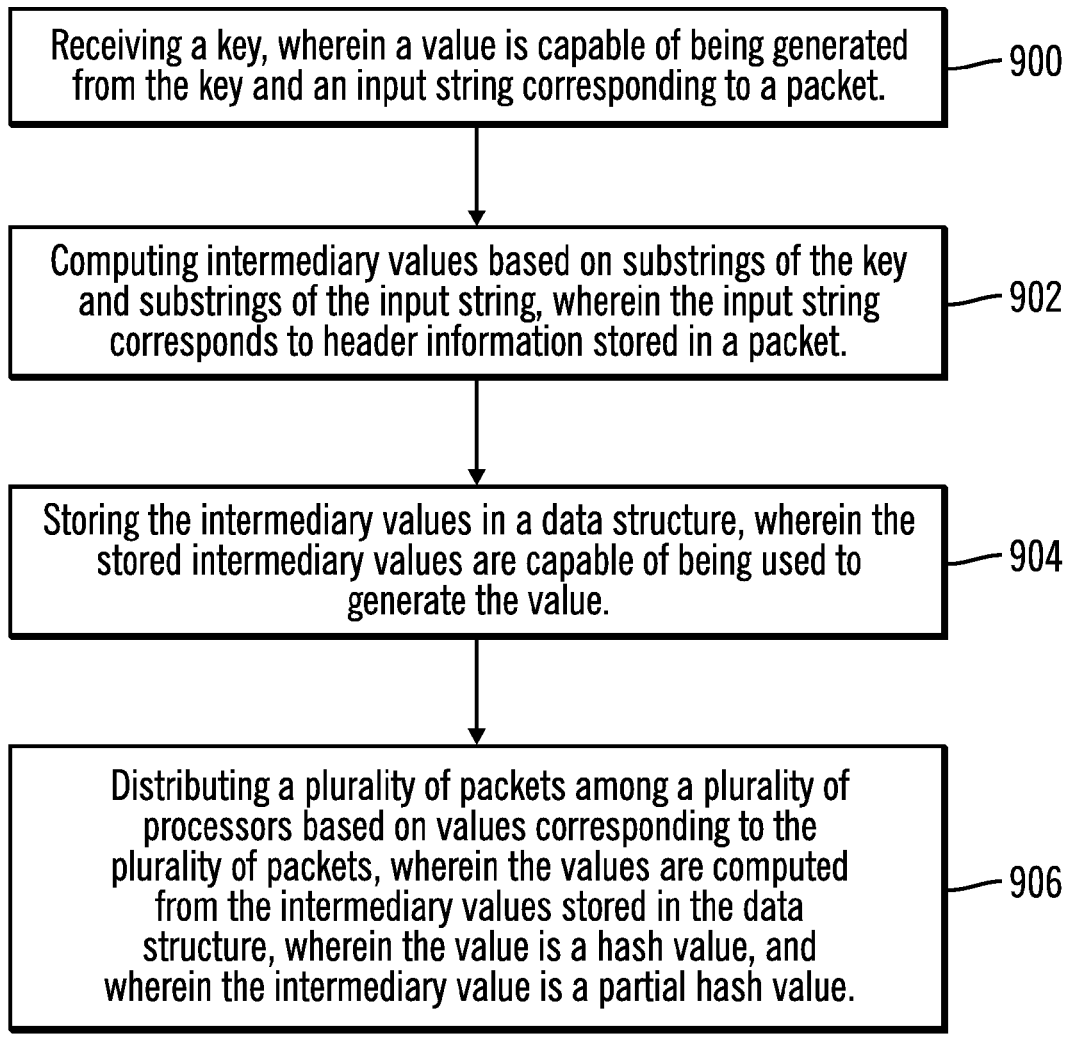
FIG. 9 illustrates second operations for computing a value from intermediary values, in accordance with certain embodiments.

FIG. 9 illustrates second operations implemented in the hash calculator 112 for computing the value 202 from intermediary values, in accordance with certain embodiments.

Control starts at block 900, where the hash calculator 112 receives a key 312, wherein a value 202 is capable of being generated from the key 112 and an input string 310 corresponding to a packet 300. The hash calculator 112 computes (at block 902) intermediary values based on substrings of the key 312 and substrings of the input string 310, wherein the input string 310 corresponds to header information stored in a packet. In certain exemplary embodiments, the header information may include the source and destination addresses 302, 304 and the source and destination ports 306, 308. The hash calculator 112 stores (at block 904) the intermediary values in a data structure 114, wherein the stored intermediary values are capable of being used to generate the value 202.

The hash calculator distributes (at block 906) a plurality of packets among a plurality of processors 108a . . . 108n based on values corresponding to the plurality of packets, wherein the values are computed from the intermediary values stored in the data structure 114, wherein the value is a value, and wherein the intermediary value is a partial value.

Figure 10:
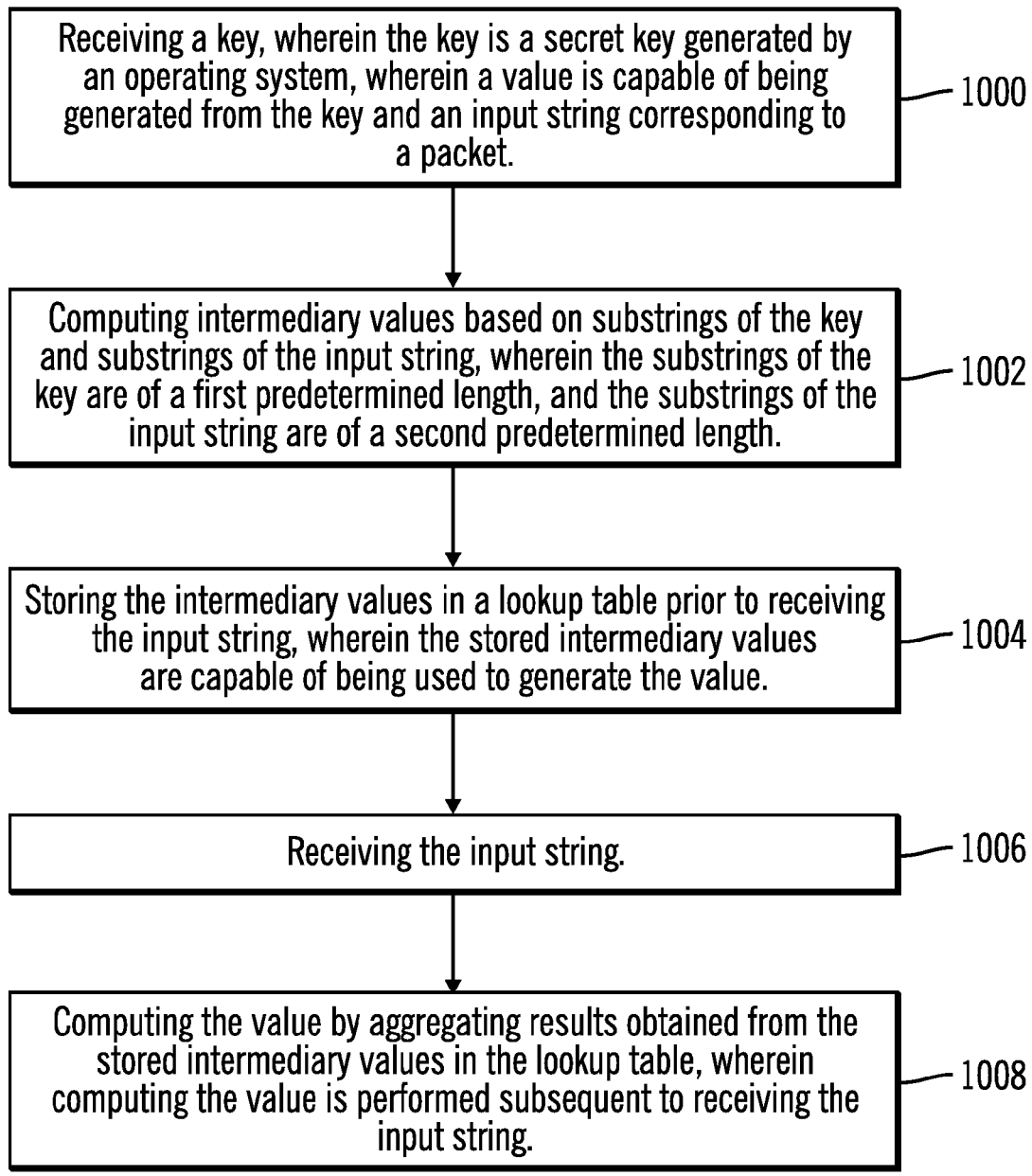
FIG. 10 illustrates third operations for computing a value from intermediary values, in accordance with certain embodiments.

FIG. 10 illustrates third operations implemented in the hash calculator 112 for computing the value 202 from intermediary values, in accordance with certain embodiments.

Control starts at block 1000, where the hash calculator 112 receives a key 312, wherein the key 312 is a secret key generated by the operating system 110, wherein a value 202 is capable of being generated from the key 112 and an input string 310 corresponding to a packet 300.

The hash calculator 112 computes (at block 1002) intermediary values based on substrings of the key 312 and substrings of the input string 310 wherein the substrings of the key 312 are of a first predetermined length, and the substrings of the input string are of a second predetermined length. For example, in certain embodiments the substrings of the key 312 may be four bytes in length and the substrings of the input string 310 may be one bye in length.

The hash calculator 112 stores (at block 1004) the intermediary values in a lookup table 114 prior to receiving the input string 310 wherein the stored intermediary values are capable of being used to generate the value 202. For example, in certain embodiments the hash calculator 112 stores (at block 1004) the intermediary values in the lookup table 114 during boot time when no packets have been received.

The hash calculator 112 receives (at block 1006) the input string 310. The hash calculator 112 computes (at block 1008) the value 202 by aggregating results obtained from the stored intermediary values in the lookup table 114, wherein computing the value 202 is performed after receiving the input string 310. For example, in certain embodiments computing the value 202 is performed during run time.

Certain embodiments described in FIGS. 1-3 and 5-9 reduce the processing load on the processors 108a . . . 108n during run time, by storing intermediary values in the lookup table 114 at boot time. During run time, the stored intermediary values are used to compute the value 202 in response to packets being received by the computational platform 102. In certain alternative embodiments, the hash calculator 112 described in FIGS. 1-3 and 5-9 may be implemented in the network interface hardware 106.

Certain embodiments may utilize the RSS feature in the network interface hardware 106, where the network interface hardware 106 does not include hardware support for computing the hash function. In alternative embodiments, the redirection table 116 may be implemented in software outside the network interface hardware 106.

Although the hash calculations in the embodiments have been implemented with reference to bytes and bits, other units of data representation may be used in alternative embodiments. In additional embodiments, the lookup table 114 may be implemented via data structures that are different from those described in FIG. 5. To reduce the usage of memory, in certain embodiments the lookup table 114 may not use 36 bytes of the key 312. For example, in certain embodiments values 202 of packets of a first protocol may be calculated by using 12 bytes of the key 312 in the lookup table 114. If a packet belonging to a second protocol whose value 202 cannot be calculated by using only 12 bytes of the key 312 arrives, then the packet belonging to the second protocol may be processed by calculating the value 202 in accordance with the CalcHash 400 function that does not use the lookup table 114.

The described techniques may be implemented as a method, apparatus or article of manufacture involving software, firmware, micro-code, hardware and/or any combination thereof. The term "article of manufacture" as used herein refers to program instructions, code and/or logic implemented in circuitry [e.g., an integrated circuit chip, Programmable Gate Array (PGA), Application Specific Integrated Circuit (ASIC), etc.] and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed. Furthermore, program logic that includes code may be implemented in hardware, software, firmware or many combination thereof.

Figure 11:
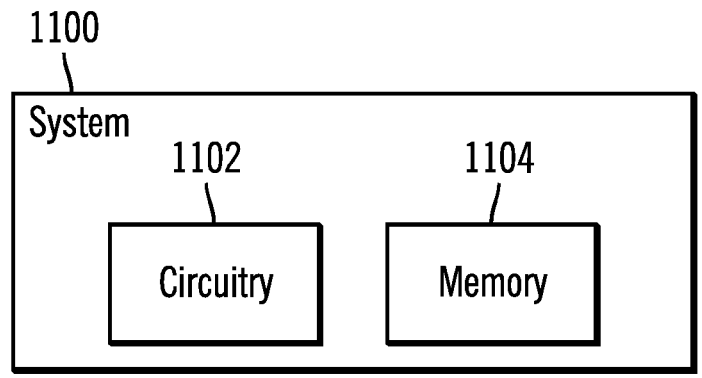
FIG. 11 illustrates a block diagram of a first system corresponding to certain elements of the computing environment, in accordance with certain embodiments.

The described operations of FIGS. 8, 9, 10 may be performed by circuitry, where "circuitry" refers to either hardware or software or a combination thereof. The circuitry for performing the operations of the described embodiments may comprise a hardware device, such as an integrated circuit chip, a PGA, an ASIC, etc. The circuitry may also comprise a processor component, such as an integrated circuit, and code in a computer readable medium, such as memory, wherein the code is executed by the processor to perform the operations of the described embodiments. Certain embodiments illustrated in FIG. 11 may implement a system 1100 comprising circuitry 1102 coupled to a memory 1104, wherein the circuitry 1104 is operable to: (a) receive a key, wherein a value is capable of being generated from the key and an input string corresponding to a packet; (b) compute intermediary values based on substrings of the key and substrings of the input string; and (c) store the intermediary values in a data structure, wherein the stored intermediary values are capable of being used to generate the value. In certain embodiments, the system 1100 may be implemented by the computational platform 102. In certain alternative embodiments, the system 1100 may be implemented by the network interface hardware 106. In certain additional embodiments the memory 1102 may be included in the circuitry 1104.

Figure 12:
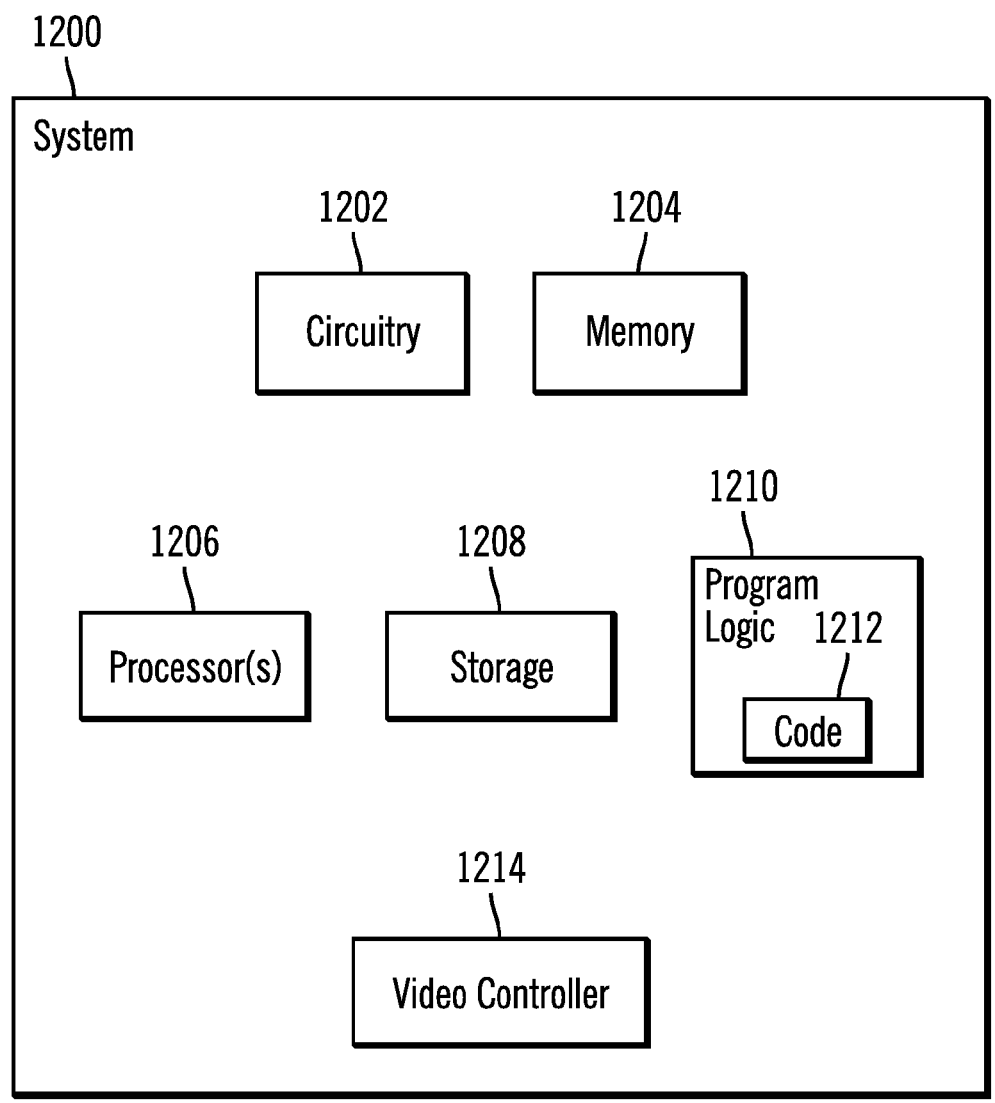
FIG. 12 illustrates a block diagram of a second system corresponding to certain elements of the computing environment, in accordance with certain embodiments.

FIG. 12 illustrates a block diagram of a system 1200 in which certain embodiments may be implemented. Certain embodiments may be implemented in systems that do not require all the elements illustrated in the block diagram of the system 1200. The system 1200 may include circuitry 1202 coupled to a memory 1204, wherein the described operations of FIGS. 8, 9, 10 may be implemented by the circuitry 1202. In certain embodiments, the system 1200 may include a processor 1206 and a storage 1208, wherein the storage 1208 may be associated with program logic 1210 including code 1212, that may be loaded into the memory 1204 and executed by the processor 1206. In certain embodiments the program logic 1210 including code 1212 is implemented in the storage 1208. In certain embodiments, the operations performed by program logic 1210 including code 1212 may be implemented in the circuitry 1202. Additionally, the system 1200 may also include a video controller 1214. The operations described in FIGS. 8, 9, 10 may be performed by the system 1200.

Certain embodiments may be implemented in a computer system including the video controller 1214 to render information to display on a monitor coupled to the computer system, where the computer system may comprise a desktop, workstation, server, mainframe, laptop, handheld computer, etc. An operating system may be capable of execution by the computer system, and the video controller 1214 may render graphics output via interactions with the operating system. Alternatively, some embodiments may be implemented in a computer system that does not include the video controller 1214, such as, a switch, router, etc. Furthermore, in certain embodiments the network interface hardware 106 may be included in a card coupled to a computer system or on a motherboard of a computer system.

Certain embodiments may be implemented in a computer system including a storage controller, such as, a Small Computer System Interface (SCSI), AT Attachment Interface (ATA), Redundant Array of Independent Disk (RAID), etc., controller, that manages access to a non-volatile storage device, such as a magnetic disk drive, tape media, optical disk, etc. Certain alternative embodiments may be implemented in a computer system that does not include a storage controller, such as, certain hubs and switches.

At least certain of the operations of FIGS. 8-10 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-12 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   receiving a key, wherein a value is capable of being generated from the key and an input string corresponding to a packet;
   computing intermediary values based on substrings of the key and substrings of the input string;
   storing the intermediary values in a data structure at boot time, wherein the stored intermediary values are capable of being used to generate the value;
   receiving the input string;
   performing exclusive OR operations on selected intermediary values based on bits in the received input string;
   computing the value by aggregating results obtained from the stored intermediary values in the data structure, subsequent to the performing of the exclusive OR operations; and
   queuing the packet corresponding to the received input string to a corresponding processor of a plurality of processors, wherein the queuing of the packet is based on the value, wherein the key is a secret key generated by an operating system, and wherein the receiving, computing, and storing are performed by an application in a computational platform including a network interface hardware that does not provide support for receive side scaling.

2. The method of claim 1, wherein the intermediary values are computed from the substrings of the key starting at selected key offsets and selected byte values.

3. The method of claim 2, wherein storing the intermediary values in the data structure is performed prior to receiving the input string, and wherein computing the value is performed subsequent to receiving the input string.

4. The method of claim 3, wherein the value is a hash value, and wherein the intermediary value is a partial hash value, wherein the input string corresponds to header information stored in the packet, further comprising:
   distributing a plurality of packets among a plurality of processors based on hash values corresponding to the plurality of packets, wherein the hash values are computed from the partial hash values stored in the data structure.

5. The method of claim 1, wherein the substrings of the key are of a first predetermined length, and the substrings of the input string are of a second predetermined length, and wherein the data structure represents a lookup table.

6. A system, comprising:
   a memory;
   a network interface hardware coupled to the memory, wherein the network interface hardware does not provide hardware support for receive side scaling; and
   circuitry coupled to the memory, wherein the circuitry is operable to:
   receive a key, wherein a value is capable of being generated from the key and an input string corresponding to a packet;
   compute intermediary values based on substrings of the key and substrings of the input string;
   store the intermediary values in a data structure at boot time, wherein the stored intermediary values are capable of being used to generate the value;
   receive the input string;
   perform exclusive OR operations on selected intermediary values based on bits in the received input string;
   compute the value by aggregating results obtained from the intermediary values stored in the data structure, subsequent to the performing of the exclusive OR operations; and
   queue the packet corresponding to the received input string to a corresponding processor of a plurality of processors, wherein the value is used to queue the packet, wherein the key is a secret key generated by an operating system, and wherein reception of the key, computation of the intermediary values, and storage of the intermediary values are performed by an application coupled to the operating system.

7. The system of claim 6, wherein the intermediary values are computed from the substrings of the key starting at selected key offsets and selected byte values.

8. The system of claim 7, wherein storage of the intermediary values in the data structure is performed prior to a reception of the input string, and wherein computation of the value is performed subsequent to the reception of the input string.

9. The system of claim 8, wherein the value is a hash value, wherein the intermediary value is a partial hash value, wherein the input string corresponds to header information stored in the packet, and wherein the circuitry is further operable to:
distribute a plurality of packets among a plurality of processors based on hash values corresponding to the plurality of packets, wherein the hash values are computed from the stored partial hash values stored in the data structure.

10. The system of claim 6, wherein the substrings of the key are of a first predetermined length, and the substrings of the input string are of a second predetermined length, and wherein the data structure represents a lookup table.

11. A system, comprising:
a computational platform;
a storage controller implemented in the computational platform;
a network interface hardware coupled to the memory, wherein the network interface hardware does not provide hardware support for receive side scaling;
memory implemented in the computational platform; and
circuitry coupled to the memory, wherein the circuitry is operable to:
receive a key, wherein a value is capable of being generated from the key and an input string corresponding to a packet;
compute intermediary values based on substrings of the key and substrings of the input string;
store the intermediary values in a data structure at boot time, wherein the stored intermediary values are capable of being used to generate the value;
receive the input string;
perform exclusive OR operations on selected intermediary values based on bits in the received input string;
compute the value by aggregating results obtained from the intermediary values stored in the data structure, subsequent to the performing of the exclusive OR operations; and
queue the packet corresponding to the received input string to a corresponding processor of a plurality of processors, wherein the value is used to queue the packet, wherein the key is a secret key generated by an operating system, and wherein reception of the key, computation of the intermediary values, and storage of the intermediary values are performed by an application coupled to the operating system.

12. The system of claim 11, wherein the intermediary values are computed from the substrings of the key starting at selected key offsets and selected byte values.

13. The system of claim 12, wherein storage of the intermediary values in the data structure is performed prior to a reception of the input string, and wherein computation of the value is performed subsequent to the reception of the input string.

14. The system of claim 13, wherein the value is a hash value, wherein the intermediary value is a partial hash value, wherein the input string corresponds to header information stored in the packet, and wherein the circuitry is further operable to:
distribute a plurality of packets among a plurality of processors based on hash values corresponding to the plurality of packets, wherein the hash values are computed from the stored partial hash values stored in the data structure.

15. The system of claim 11, wherein the substrings of the key are of a first predetermined length, and the substrings of the input string are of a second predetermined length, and wherein the data structure represents a lookup table.

16. An article of manufacture, comprising a storage medium having stored therein instructions capable of being executed by a machine to:
receive a key, wherein a value is capable of being generated from the key and an input string corresponding to a packet;
compute intermediary values based on substrings of the key and substrings of the input string;
store the intermediary values in a data structure at boot time, wherein the stored intermediary values are capable of being used to generate the value;
receive the input string;
perform exclusive OR operations on selected intermediary values based on bits in the received input string;
compute the value by aggregating results obtained from the intermediary values stored in the data structure, subsequent to the performing of the exclusive OR operations; and
queue the packet corresponding to the received input string to a corresponding processor of a plurality of processors, wherein the value is used to queue the packet, wherein the key is a secret key generated by an operating system, and wherein reception of the key, computation of the intermediary values, and storage of the intermediary values are performed by an application in a computational platform including a network interface hardware, and wherein the network interface hardware does not provide support for receive side scaling.

17. The article of manufacture of claim 16, wherein the intermediary values are computed from the substrings of the key starting at selected key offsets and selected byte values.

18. The article of manufacture of claim 17, wherein storage of the intermediary values in the data structure is performed prior to a reception of the input string, and wherein computation of the value is performed subsequent to the reception of the input string.

19. The article of manufacture of claim 18, wherein the value is a hash value, wherein the intermediary value is a partial hash value, wherein the input string corresponds to header information stored in the packet, and wherein the instructions are further capable of being executed by a machine to:
distribute a plurality of packets among a plurality of processors based on hash values corresponding to the plurality of packets, wherein the hash values are computed from the partial hash values stored in the data structure.

20. The article of manufacture of claim 16, wherein the substrings of the key are of a first predetermined length, and the substrings of the input string are of a second predetermined length, and wherein the data structure represents a lookup table.

* * * * *